(12) United States Patent
Park

(10) Patent No.: US 7,712,829 B2
(45) Date of Patent: May 11, 2010

(54) SEAT STRUCTURE FOR VEHICLE

(75) Inventor: Gilsam Park, Kanagawa (JP)

(73) Assignee: Johnson Controls Technology Company, Holland, MI (US)

( * ) Notice: Subject to any disclaimer, the term of this patent is extended or adjusted under 35 U.S.C. 154(b) by 370 days.

(21) Appl. No.: 11/791,745

(22) PCT Filed: Mar. 4, 2005

(86) PCT No.: PCT/JP2005/003777

§ 371 (c)(1),
(2), (4) Date: May 29, 2007

(87) PCT Pub. No.: WO2006/059404

PCT Pub. Date: Jun. 8, 2006

(65) Prior Publication Data

US 2008/0122279 A1    May 29, 2008

(30) Foreign Application Priority Data

Nov. 30, 2004    (JP)    ............... 2004-346033

(51) Int. Cl.
A47C 15/00    (2006.01)
(52) U.S. Cl. .............. 297/234; 297/232; 297/243; 297/257; 297/344.11; 296/65.1
(58) Field of Classification Search ............... 297/232, 297/234, 243, 257, 344.1, 344.11; 296/65.1, 296/65.13; 248/429, 430
See application file for complete search history.

(56) References Cited

U.S. PATENT DOCUMENTS

| 4,157,797 | A | * | 6/1979 | Fox ..................... 244/122 R |
| 4,949,931 | A | * | 8/1990 | Fujiwara et al. ............. 248/429 |
| 5,364,152 | A | * | 11/1994 | Mastrangelo et al. ..... 296/65.03 |
| 5,605,368 | A | * | 2/1997 | Noma et al. ................. 296/64 |
| 5,868,450 | A | * | 2/1999 | Hashimoto ............... 296/65.09 |
| 5,868,451 | A | * | 2/1999 | Uno et al. .................... 296/66 |
| 5,951,084 | A | * | 9/1999 | Okazaki et al. .......... 296/37.16 |

(Continued)

FOREIGN PATENT DOCUMENTS

JP    7-27935    5/1995

(Continued)

*Primary Examiner*—Laurie K Cranmer
(74) *Attorney, Agent, or Firm*—Foley & Lardner LLP

(57) ABSTRACT

A seat structure for a vehicle includes front and rear seat bodies each including a seat cushion and a back rest. Each seat cushion has a front part configured to be tipped up about a rear part of the seat cushion. Each back rest has an upper part configured to be tilted backward and forward about a lower part of the back rest. The seat structure also includes first slide rails supporting the front and rear seat bodies in a fore and aft arrangement respectively. The front and rear seat bodies are configured to move backward and forward along the first slide rails. The seat structure further includes a lock member coupled to the front seat body for selectively securing the front seat body relative to the first slide rails. The lock member is movable between a locked position and a released position. The seat structure further includes a push member coupled to the rear seat body. The push member engages the front seat body to move the lock member into the released position so that the front seat body can be moved forward by the rear seat body.

14 Claims, 11 Drawing Sheets

U.S. PATENT DOCUMENTS

| | | | |
|---|---|---|---|
| 6,196,613 B1 * | 3/2001 | Arai | 296/65.13 |
| 6,457,765 B1 * | 10/2002 | Bergquist et al. | 296/64 |
| 7,229,117 B2 * | 6/2007 | Okuda et al. | 296/64 |
| 2002/0021016 A1 * | 2/2002 | Bergquist et al. | 296/65.09 |

FOREIGN PATENT DOCUMENTS

| | | |
|---|---|---|
| JP | 10-100753 | 4/1998 |
| JP | 2002-104039 | 4/2002 |

* cited by examiner

SEAT STRUCTURE FOR VEHICLE

CROSS-REFERENCE TO RELATED PATENT APPLICATIONS

The present application is a National Stage of International Application No. PCT/JP2005/003777 filed on Mar. 4, 2005, which claims the benefit of Japanese Patent Application No. 2004-346033 filed on Nov. 30, 2004. The entire disclosures of International Application No. PCT/JP2005/003777 and Japanese Patent Application No. 2004-346033 are incorporated herein by reference.

BACKGROUND

The present disclosure relates to a seat structure for a vehicle including a seat body having at least a seat cushion whose front part is capable of being tipped up about its rear part and a back rest whose upper part is capable of tilting backward and forward about its lower part.

It is generally known to provide a seat structure for a vehicle that includes seats including at least a seat cushion and a back rest. The seat cushion has a front part capable of being tipped up about its rear part from a seated position. The back rest has an upper part capable of tilting backward and forward about its lower part. The seat cushions are slidable backward and forward, the seats are capable of being collected together in a place. Such a seat structure has been widely used in vehicles such as RVs, vans and the like, which have a vehicle compartment serving as a cargo room and a passenger compartment, or in which a single space is created for the two purposes. An example of such a seat is disclosed in Japanese Patent Application Laid-open Publication No. 2002-104039. Seats of this kind, however, have to be operated and moved one by one. Such a requirement makes poor operability with which the seats are collected together in a place.

Accordingly, there is a need to provide a seat capable of solving the above-mentioned problem. There is also a need to provide a vehicle seat structure that has an improved operability for collecting seats together in a place in a forward portion of the seat structure.

SUMMARY

One exemplary embodiment relates to a seat structure for a vehicle. The seat structure includes a front seat body including a seat cushion with a front part configured to be tipped up about a rear part of the seat cushion from a seated position and a back rest with an upper part configured to be tilted backward and forward about a lower part of the back rest. The seat structure also includes a rear seat body including a seat cushion with a front part configured to be tipped up about a rear part of the seat cushion from a seated position and a back rest with an upper part configured to be tilted backward and forward about a lower part of the back rest. The seat structure further includes first slide rails supporting the front seat body and the rear seat body in a fore and aft manner respectively, each of the front and rear seat bodies being configured to move backward and forward along the first slide rails to an appropriate position and stopping there. The seat structure further includes operating means for moving the back rest of each of the front and rear seat bodies to a position where the back rest stands substantially upright, for concurrently tipping up the seat cushion of each of the front and rear seat bodies, and for positioning the front seat body to be moved forward by the rear seat body.

Another exemplary embodiment relates to a seat structure for a vehicle. The seat structure includes front and rear seat bodies each including a seat cushion and a back rest. Each seat cushion has a front part configured to be tipped up about a rear part of the seat cushion. Each back rest has an upper part configured to be tilted backward and forward about a lower part of the back rest. The seat structure also includes first slide rails supporting the front and rear seat bodies in a fore and aft arrangement respectively. The front and rear seat bodies are configured to move backward and forward along the first slide rails. The seat structure further includes a lock member coupled to the front seat body for selectively securing the front seat body relative to the first slide rails. The lock member is movable between a locked position and a released position. The seat structure further includes a push member coupled to the rear seat body. The push member engages the front seat body to move the lock member into the released position so that the front seat body can be moved forward by the rear seat body.

Another exemplary embodiment relates to a method of selectively moving a first seat body and a second seat body within a vehicle. The method includes the steps of providing front and rear seat bodies each including a seat cushion and a back rest, providing first slide rails supporting the front and rear seat bodies in a fore and aft arrangement respectively, providing a lock member coupled to the front seat body for selectively securing the front seat body relative to the first slide rails, providing a push member coupled to the rear seat body and allowing the lock member to move to the released position when the push member engages the front seat body so that the front seat body can be moved forward by the rear seat body. Each seat cushion has a front part configured to be tipped up about a rear part of the seat cushion. Each back rest has an upper part configured to be tilted backward and forward about a lower part of the back rest. The front and rear seat bodies being configured to move backward and forward along the first slide rails. The lock member is movable between a locked position and a released position.

DETAILED DESCRIPTION

Figure 1:
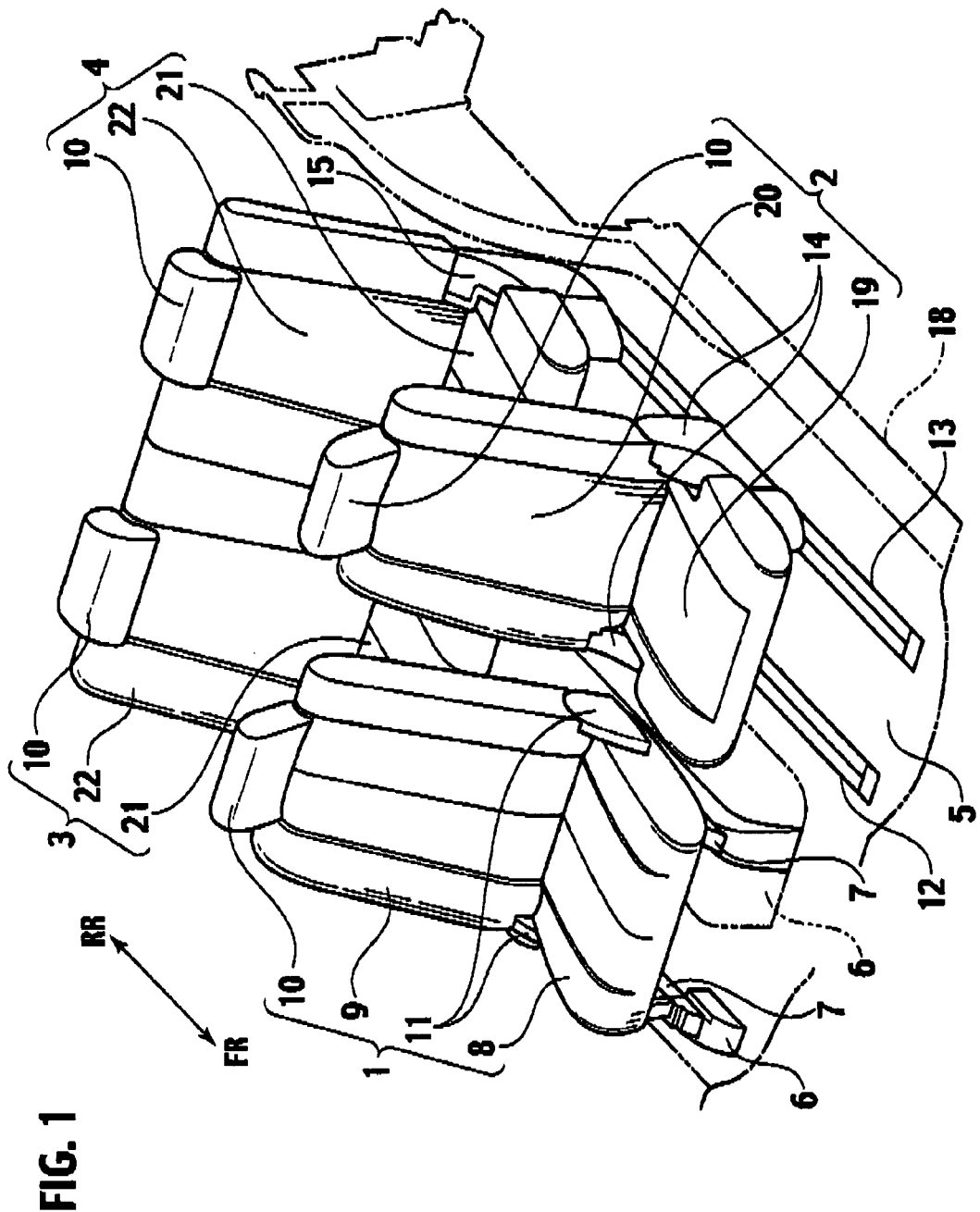
FIG. 1 is a perspective view of a seat structure for a vehicle according to an exemplary embodiment as viewed from a front showing the seat structure in a normal condition.

Referring generally to the FIGURES, a seat structure for a vehicle is shown according to an exemplary embodiment. The seat structure includes a front seat body and a rear seat body. The front seat body includes a seat cushion and a back rest. The seat cushion has a front part capable of being tipped up about its rear part from a seated position. The back rest has an upper part capable of tilting backward and forward about its lower part. The rear seat body also includes a seat cushion and a back rest. The seat cushion has a front part capable of being tipped up about its rear part from a seated position. The back rest has an upper part capable of tilting backward and forward about its lower part. In such an embodiment, at least one front seat body and at least one rear seat body are arranged fore and aft respectively on the same slide rails, and each of the front and rear seat bodies are capable of moving backward and forward to an appropriate position, and of stopping at such a position. In addition, operating means causes the back rest of each of the front and rear seat bodies to move to a position where the back rest stands almost upright, concurrently causes the seat cushion of each of the front and rear seat bodies to be tipped up, and thus makes the rear seat body capable of moving the front seat body forward.

According to an exemplary embodiment, the operating means causes each of the front and rear seat bodies to move to the position where the back rest stands almost upright, concurrently causes the seat cushion of each of the front and rear seat bodies to be tipped up, and thus makes the rear seat body capable of moving the front seat body forward. In such an embodiment, the front seat body is capable of being moved forward by operating only the rear seat body after a predetermined operation thereby improving the operability with which the seat bodies are collected together in a place.

According to an exemplary embodiment, the front seat body includes forward/backward slide locking means and interlocking means, the rear seat body includes pressing means, and the forward/backward sliding means and the interlocking means are capable of being released by the pressing means.

According to an exemplary embodiment, the forward/backward slide locking means and the interlocking means are capable of being released by the pressing means of the rear seat body. In such an embodiment, by the pushing of the back of the front seat body from the rear seat body, the pressing means releases the forward/backward slide locking means and the interlocking means. Thus, using a force with which the rear seat body is pushed forward, the front seat body can move forward as well.

According to an exemplary embodiment, each of the front and rear seat bodies includes a tip-up mechanism for tipping up the seat cushion. The tip-up mechanism includes seated position holding means, tip-up releasing means, biasing means, holding means and return release means. The tip-up means releases the seated position holding means of the seat cushion by moving the back rest to the position where the back rest stands almost upright. The biasing means tips up the seat cushion, made ready to be tipped up by the tip-up releasing means, to a predetermined position. The holding means holds the seat cushion that has been moved to the tipped-up position at the same tipped-up position. The return release means is capable of releasing the holding means.

According to an exemplary embodiment, when the back rest is moved to a position where the back rest stands almost upright, the tip-up mechanism makes it possible to release the holding means of the seat cushion held in the seated position, to thus cause the biasing means to tip up and move the seat cushion, and to hence cause the holding means to hold the seat cushion that has been tipped up at the same position. In addition, the tip-up mechanism includes the return release means capable of releasing the holding means. This makes it possible to return the seat cushion to its original position.

According to an exemplary embodiment, the pressing means of the rear seat body includes a push plate arranged in a forward portion of the rear seat body. The front seat body includes moving means. The forward/backward slide locking means includes stopper means. The moving means of the front seat body includes a release bracket capable of moving forward when pressed by the push plate, and slide lock releasing means releasing the stopper means of the forward/backward slide locking means when pushed forward by the release bracket. The front seat body also includes interlock releasing means releasing the interlocking means when pushed forward by the release bracket.

According to an exemplary embodiment, the stopper means of the forward/backward slide locking means and the interlocking means can be released when the release bracket of the front seat body is pushed by the push plate of the rear seat body. For this reason, the front seat body can be moved when pushed by the rear seat body.

According to an exemplary embodiment, the seat structure has the configuration in which a forefront side portion of the push plate of the rear seat body is located in a position jutting out forward of the seat cushion in the state of being tipped up. The forefront side portion of the push plate of the rear seat body is located in the position jutting out forward of the seat cushion in the state of being tipped up. For this reason, whenever the rear seat body is moved forward, the moving means of the front seat body is always pressed, and thus the front seat body can be moved securely along with the rear seat body.

Figure 2:
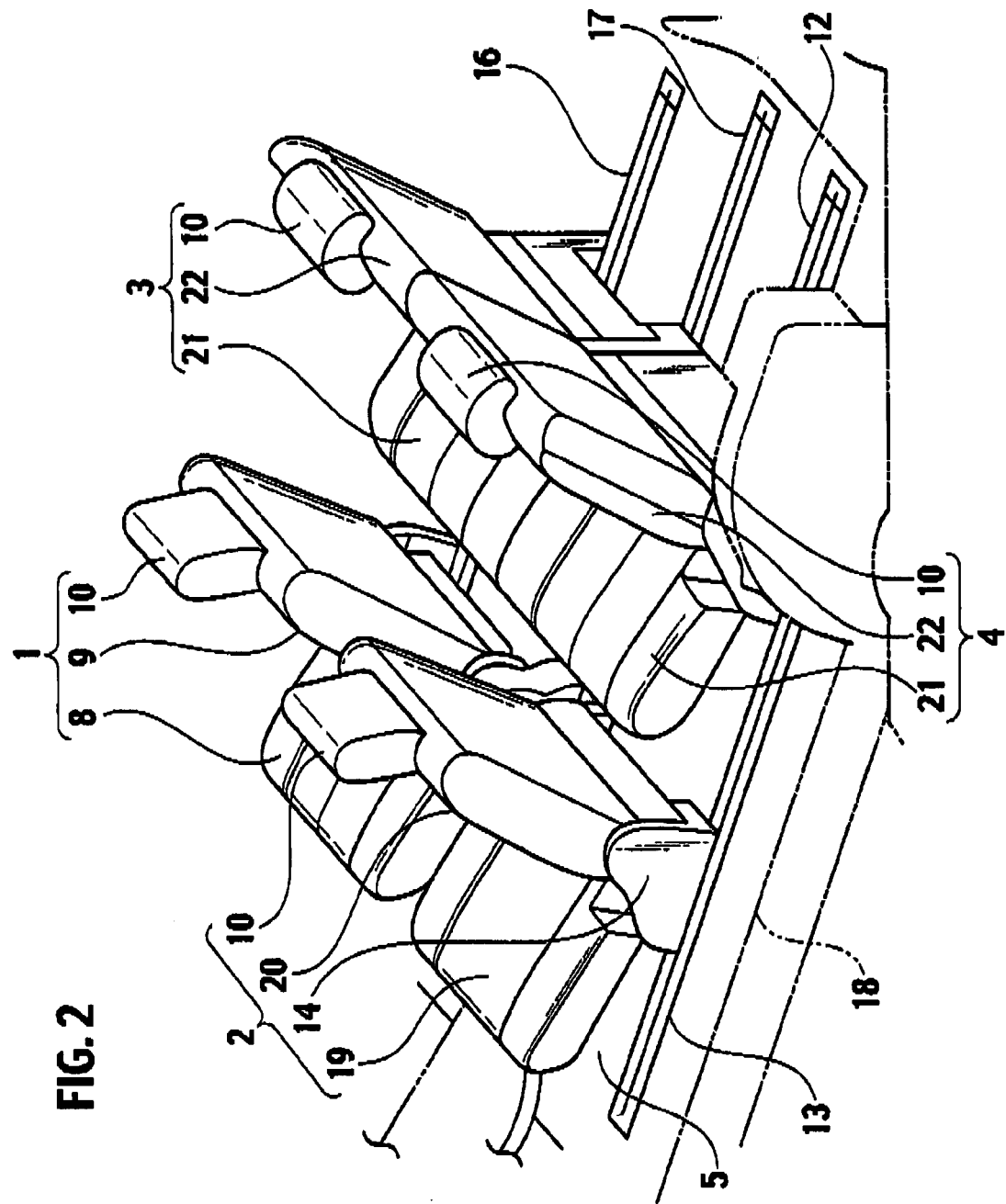
FIG. 2 is a perspective view of the seat structure shown in FIG. 1 as viewed from a rear showing the seat structure in the normal condition.

Referring to FIGS. 1 and 2 in particular, reference numeral 1 denotes a driver's seat of an automobile shown according to an exemplary embodiment. Reference numeral 2 denotes a passenger's seat (e.g., "front seat body") of the automobile shown according to an exemplary embodiment that is arranged next to the driver's seat 1. Reference numeral 3 denotes a first rear seat (e.g., a first "rear seat body") of the automobile shown according to an exemplary embodiment that is arranged rearward RR of the driver's seat 1. Reference numeral 4 denotes a second rear seat (e.g., a second "rear seat body") of the automobile shown according to an exemplary embodiment that is arranged rearward RR of the passenger's seat 2.

According to the embodiment illustrated, the driver's seat 1 includes slide units 7, a seat cushion 8, a back rest 9 and a head rest 10. Each of the slide units 7 is constructed between blocks 6 on a floor 5. The seat cushion 8 is supported by the slide units 7. The back rest 9 is supported by the seat cushion 8. The head rest 10 is supported by the top of the back rest 9.

The back rest 9 is capable of pivoting backward and forward about the bottom of the back rest 9 with a pair of reclining units 11 and 11 provided symmetrically to the seat cushion 8. Only one side of the seat cushion 8 may be provided with a reclining unit 11 while the other side of the seat cushion 8 pivotally supports the back rest 9 about the bottom of the back rest 9. Reference numeral 18 denotes side sills which are formed respectively in the right and left end portions of the floor 5.

The passenger's seat 2 and the second rear seat 4 are arranged fore and aft respectively on long slide units 12 and 13 that are arranged in parallel to each other on the floor 5. Specifically, the passenger's seat 2 and the second rear seat 4 are placed, respectively, in a front and rear part FR and RR of the slide unit 12 and 13. The first rear seat 3 is arranged on short slide units 16 and 17 that are arranged in parallel to each other on the floor 5 rearward RR of the driver's seat 1.

Figure 4:
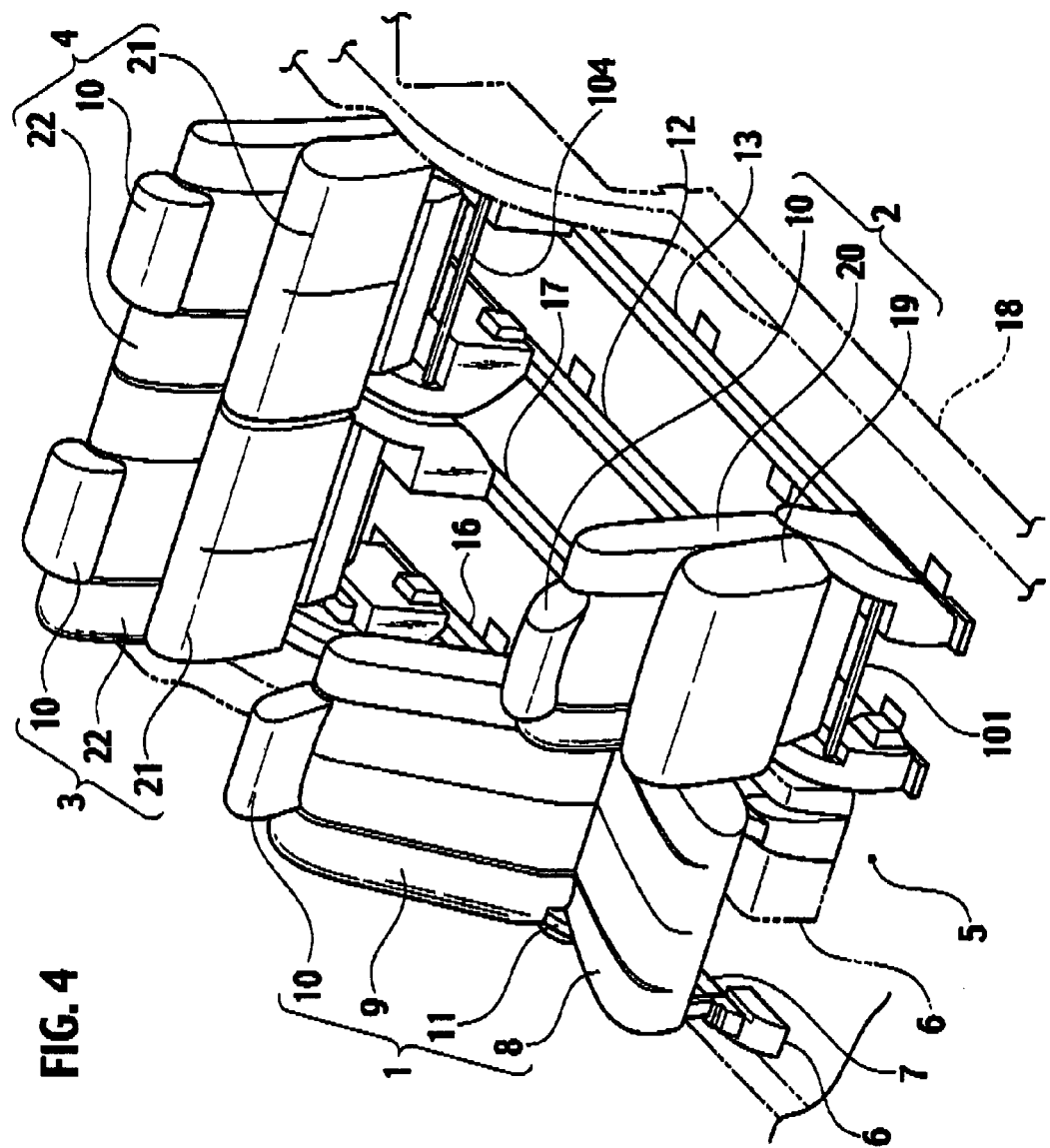
FIG. 4 is a perspective view showing that the seat cushions of the passenger's seat and the second rear seat in the seat structure for a vehicle shown in FIG. 1 are in a state of being tipped up, and that the back rests of the passenger's seat and the second rear seat are in a state of being held upright.
Figure 5:
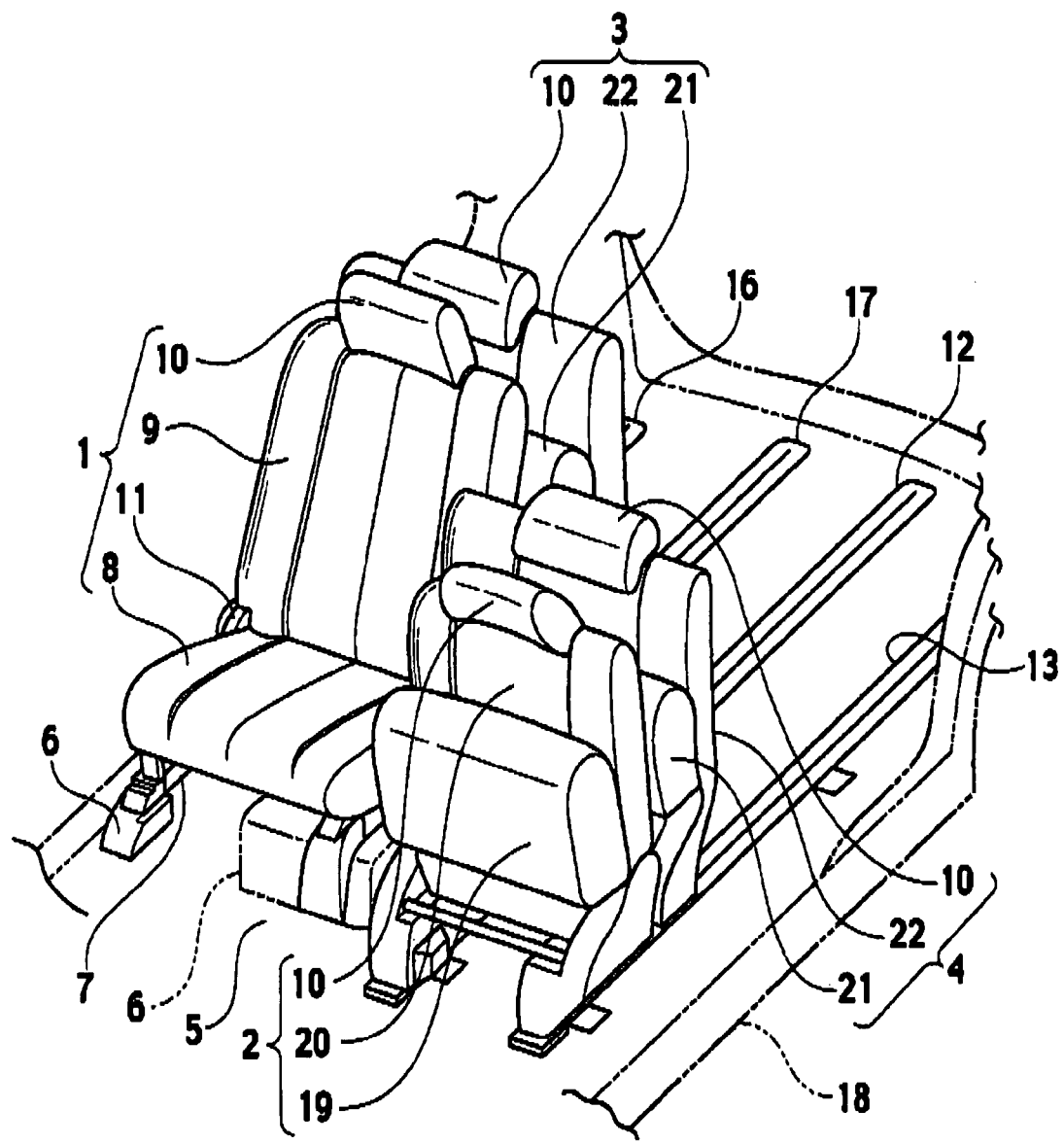
FIG. 5 is a perspective view of the passenger's seat and the second rear seat in the seat structure for a vehicle shown in FIG. 1 showing the passenger's seat and the second rear seat in a state of being collected together in a first mode area.
Figure 6:
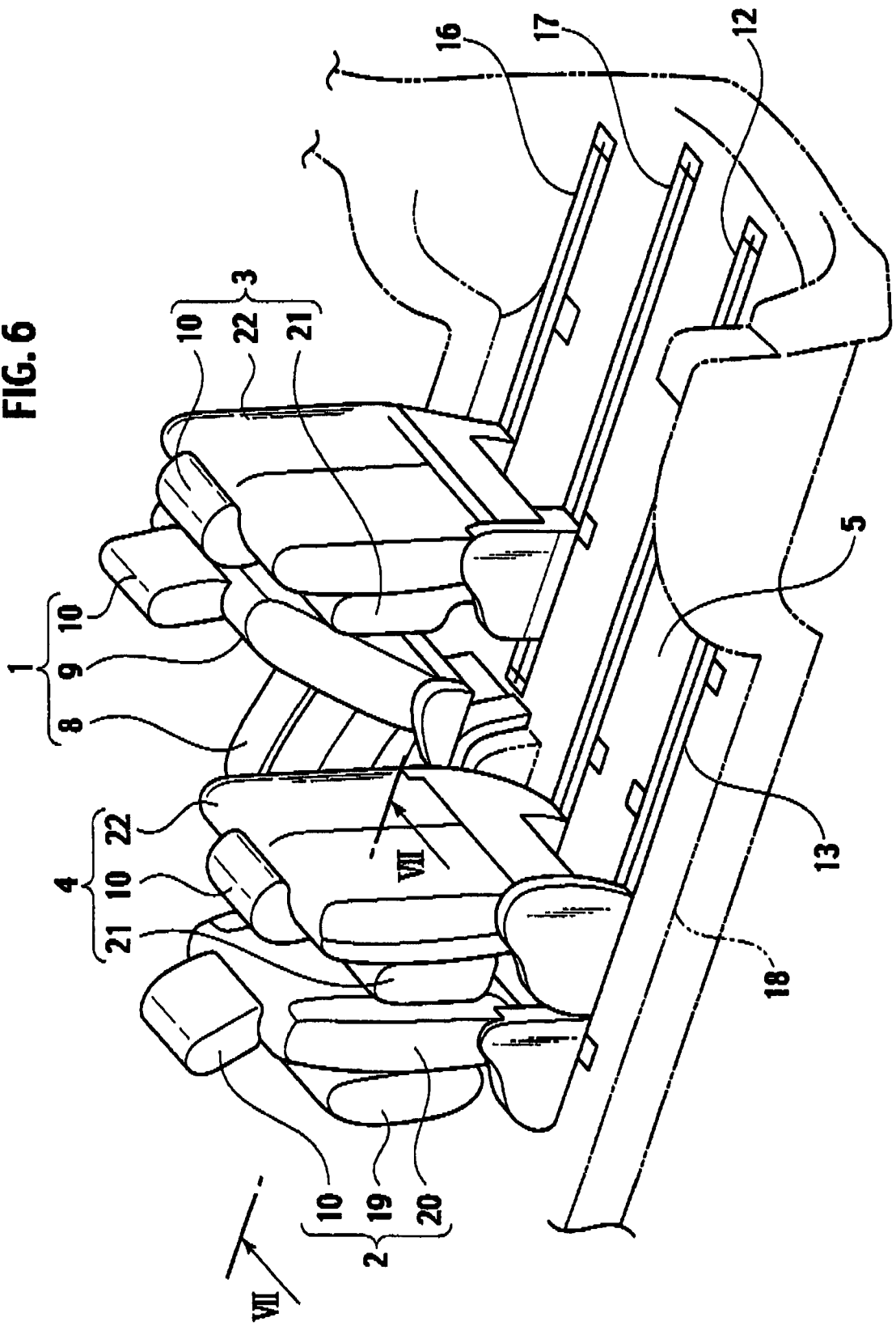
FIG. 6 is a perspective view of the passenger's seat and the second rear seat in the seat structure for a vehicle shown in FIG. 5 as viewed from the rear.
Figure 7:
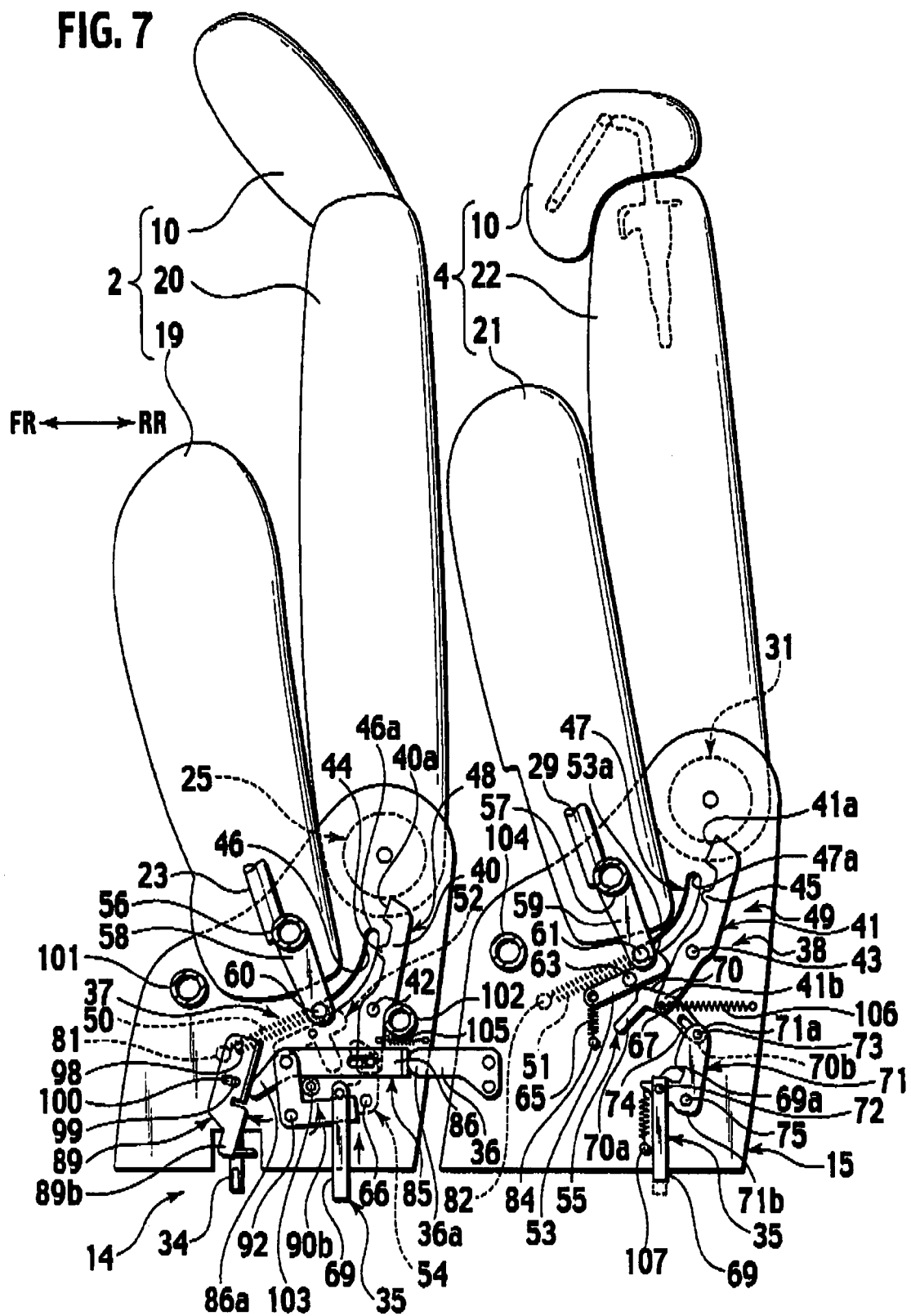
FIG. 7 is a side view of the passenger's seat and the second rear seat taken along the line VII-VII of FIG. 6 showing a relationship between the passenger's seat and the second rear seat.

According to the embodiment illustrated, the passenger's seat 2 includes base units 14 and 14 arranged symmetrically in the passenger's seat and supported respectively by the slide units 12 and 13 in a way that the base units 14 and 14 are capable of sliding backward and forward on the slide units 12 and 13. The passenger's seat 2 also includes a seat cushion 19 and a back rest 20 supported by the base units 14 and 14 and a head rest 10 supported by the top of the back rest 20. Referring to FIGS. 4 and 7, reference numerals 101, 102 and 103 denote first, second and third frames respectively, which are shaped like a pipe, and which are bridged between the base units 14 and 14.

According to the embodiment illustrated, the second rear seat 4 includes base units 15 and 15 (one of the two base units 15 and 15 can not be seen on some figures) arranged symmetrically in the first rear seat 3, and supported respectively by the slide units 12 and 13 in a way that the base units 15 and 15 are capable of sliding backward and forward on the slide units 12 and 13. The second rear seat 4 is also shown as including a seat cushion 21 and a back rest 22 supported by the base units 15 and 15 and a head rest 10 supported by the top of the back rest 22. Reference numeral 104 (shown in FIG. 4) denotes a fourth frame which is shaped like a pipe, and which is bridged between the base units 15 and 15.

According to the embodiment illustrated, the first rear seat 3 includes base units 15 and 15 (one of the two base units 15 and 15 cannot be seen on some figures) arranged symmetrically in the first rear seat 3, and supported respectively by slide units 16 and 17 in a way that the base units 15 and 15 are capable of sliding backward and forward on the slide units 16 and 17. The first rear seat 3 is also shown as including a seat cushion 21 and a back rest 22 supported by the base units 15 and 15 and a head rest 10 supported by the top of the back rest 22. Another fourth frame, which is not illustrated, is bridged between these base units 15 and 15 as well.

Figure 3:
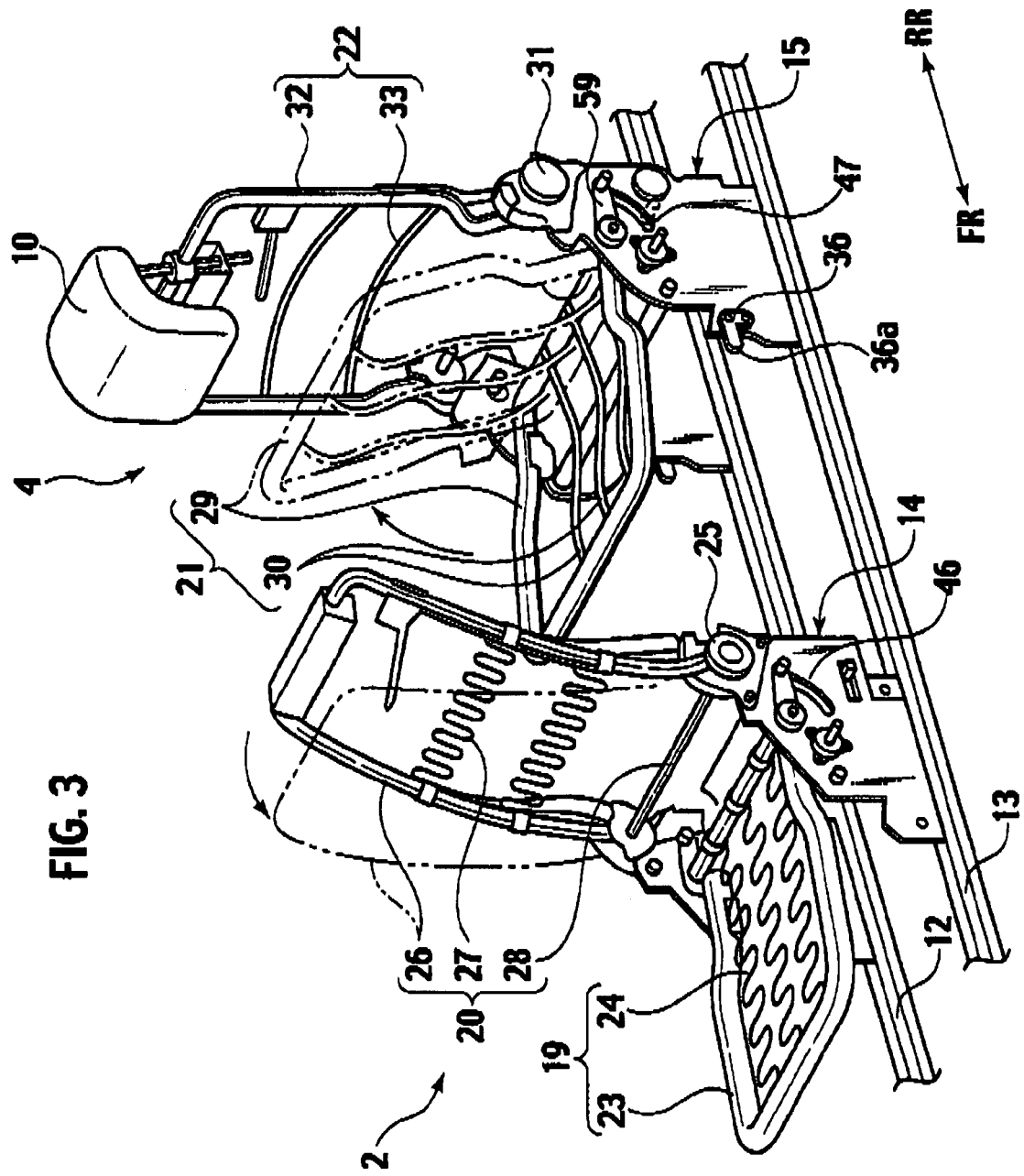
FIG. 3 is a perspective view showing a detailed structure of a passenger's seat and a second rear seat which constitute the seat structure for a vehicle shown in FIG. 1.

Referring to FIG. 3, the seat cushion 19 of the passenger's seat 2 is shown as including a cushion frame 23 looking like a closed loop when viewed from the above, and supported by the base unit 14 in a way that the cushion frame 23 is capable of pivoting about its rear portion RR so that the front portion of the cushion frame 23 is capable of being tipped up from a seated position which is virtually horizontal as shown. The seat cushion 19 is also shown as including S-shaped springs 24 suspended in the cushion frame 23. The cushion frame 23 is paced on, and held by, the first frame 101 while in the seated position which is virtually horizontal.

The back rest 20 of the passenger's seat 2 is shown as including a back frame 26, S-shaped springs 27 and a lower frame 28. The back frame 26 is supported by the base unit 14 having a reclining unit 25 in between in a way that the back frame 26 is capable of pivoting about its bottom backward and forward between a neutral position and an upright position and between the neutral position and a fully reclined position. The neutral position is that in which the upper portion of the back rest 20 tilts slightly backward as shown in FIG. 3. The upright position is that in which the back rest 20 stands virtually upright, and which is located in the front FR of the neutral position. The upright position is indicated by long dashed double-short dashed lines in FIG. 3. The fully reclined position (which is the virtually horizontal position in which the back rest 20 swings backward RR is not illustrated in FIG. 3. The back frame 26 looks like an upturned-U shape when viewed from the front. The S-shaped springs 27 are suspended in the back frame 26. The lower frame 28 is constructed between the two bottom ends of the back frame 26.

The second rear seat 4 is illustrated as representing one of the first and second rear seats 3 and 4 as shown in FIG. 3. The first and second rear seats 3 and 4 are formed symmetrically next to each other. According to an exemplary embodiment, the seat cushion 21 of the second rear seat 4 includes a cushion frame 29 and spring bodies 30. The cushion frame 29 is supported by the base unit 15 in a way that the cushion frame 29 is capable of pivoting about its rear end RR between a seated position and a tipped-up position. The seated position is indicated by the solid lines. The tipped-up position (indicated by the other long dashed double-short dashed lines in FIG. 3) is that in which the front portion of the cushion frame 29 is tipped up. The cushion frame 29 looks like a closed loop when viewed from the above. The spring bodies 30 are constructed in the cushion frame 29 and are made of steel. The cushion frame 29 is placed on, and held by, the fourth frame 104 while in the seated position that is virtually horizontal.

According to an exemplary embodiment, the back rest 22 of the second rear seat 4 includes a back frame 32 and spring bodies 33. The back frame 32 is supported by the base unit 15 having a reclining unit 31 in-between in a way that the back frame 32 is capable of pivoting about its bottom backward end forward between an upright position and a fully reclined position. The upright position is shown in FIG. 3 and the fully reclined position is not shown in FIG. 3. The back frame 32 has an upturned-U shape when viewed from the front. The spring bodies 33 are constructed in the back frame 32 and are made of steel.

Use of operating means, which is not illustrated, makes it possible to move the back rest 20 of the passenger's seat 2 as well as the back rest 22 of each of the first and second rear seats 3 and 4 to their respective upright positions, to tip up the seat cushion 19 of the passenger's seat 2 as well as the seat cushion 21 of each of the first and second rear seats 3 and 4, and to move the passenger's seat 2 forward through the first and second rear seats 3 and 4. Backward/forward slide locking means 34 and interlocking means 35 of the passenger's seat 2 (shown in FIG. 7) are capable of being released by a push plate 36 which, in this embodiment, is "pushing means" of each of the first and second rear seats 3 and 4.

Referring to FIG. 7, tip-up mechanisms 37 and 38 of the seat cushions 19 and 21 are shown as including tip-up releasing means 48 and 49, first coiled springs 50 and 51, first and second tip-up lock plates 52 and 53 and first and second interlock pin plates 54 and 55. According to the embodiment illustrated, the tip-up releasing means 48 and 49 release tip-up brackets 40 and 41, which, in this embodiment, are, in this embodiment, "seated position holding means" of the seat cushions 19 and 21, when the back rests 20 and 22 are moved to the upright positions. The first coiled springs 50 and 51, in this embodiment, are "biasing means" tipping up the seat cushions 19 and 21, which are made capable of being tipped up by the tip-up releasing means 48 and 49, to predetermined positions. The first and the second tip-up lock plates 52 and 53 are, in this embodiment, "holding means" holding the seat cushions 19 and 21, which have been moved to the tip-up positions, at the same tip-up positions. The first and the second interlock pin plates 54 and 55 are, in this embodiment, "return release means" making the first and the second tip-up lock plates 52 and 53 capable of being released.

The tip-up brackets 40 and 41, which are the "seated position holding means", are pivotally supported by the base units 14 and 15 of the seat cushions 19 and 21 in a way that first pivotally supporting parts 42 and 43 make the tip-up brackets 40 and 41 capable of pivoting. Fifth coiled springs 105 and 106 are suspended between portions, closer to lower end portions 40b and 41b than the first pivotally supporting parts 42 and 43 of the tip-up brackets 40 and 41, and rear portions RR of the base units 14 and 15. Thereby, the tip-up brackets 40 and 41 are biased counterclockwise in FIG. 7. The second frame 102 has a function of stopping the counterclockwise rotation of the tip-up bracket 40. When the operating means is operated, the reclining units 25 and 31 move the back rests 20 and 22 from the neutral positions or the fully reclined positions to the upright positions (rotate the back rests 20 and 22 forward FR). Thereby, upper end portions 40a and 41a of the tip-up brackets 40 and 41 are in the relationship with a device arm 39 (FIG. 9), in which the upper end portions 40a and 41a of the tip-up brackets 40 end 41 are pushed backward RR by the device arm 39 which rotates along with the back rests 20 and 22 while supported by the back rests 20 and 22.

Figure 9:
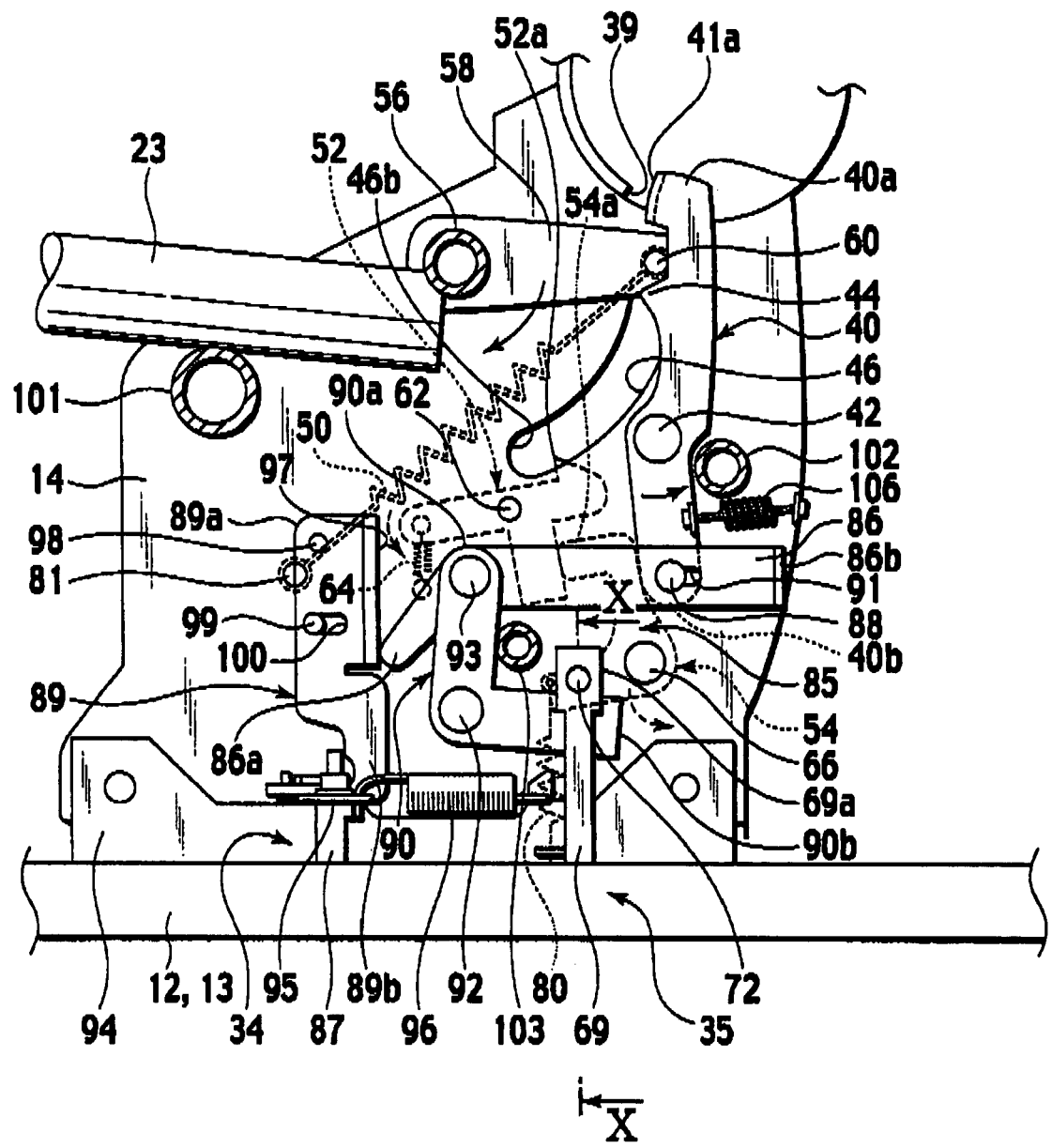
FIG. 9 is an enlarged side view showing a mechanical section of the passenger's seat shown in FIG. 7.
Figure 10:
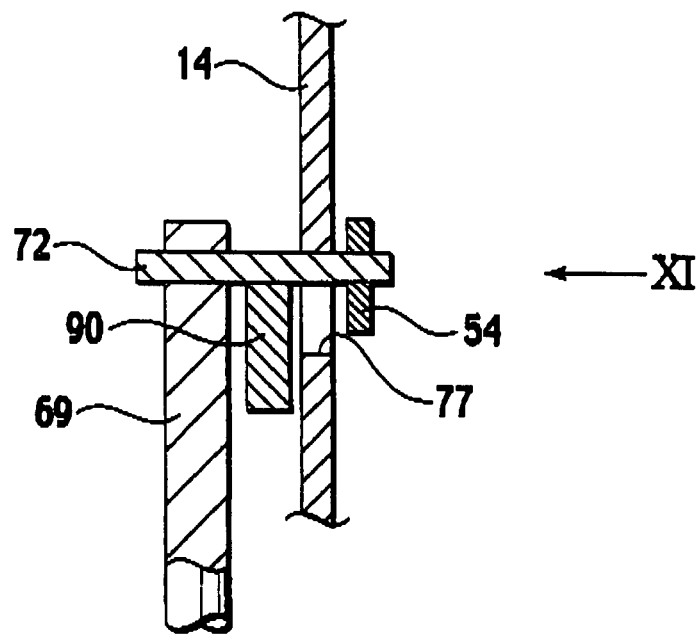
FIG. 10 is a cross-sectional view of the mechanical section of the passenger's seat taken along the line X-X of FIG. 9.

The tip-up brackets 40 and 41 rotate clockwise about the first and second pivotally supporting parts 42 and 43, respectively, in FIGS. 7 and 9. Protrusions 44 and 45 move from positions at which the protrusions 44 and 45 block long holes 46 and 47 to positions at which the protrusions 44 and 45 do not block the long holes 46 and 47 respectively. The protrusions 44 and 45 are formed respectively in the tip-up brackets 40 and 41 in a way that the protrusions 44 and 45 protrude from the tip-up brackets 40 and 41. The long holes 46 and 47 are formed respectively in the base units 14 and 15.

According to an exemplary embodiment, stopper rods 60 and 61 constantly biased by the first coiled springs 50 and 51, which, in this embodiment, are the "biasing means," are detached from upper end portions 46a and 47a of the long holes 46 and 47. The stopper rod 60 and 61 are pivotally supported by brackets 58 and 59 which extend backward RR from rotation center members 56 and 57 of the cushion frames 23 and 29, and are capable of sliding within the long holes 46 and 47. These are the tip-up releasing means 48 and 49 in this embodiment, respectively.

It should be noted that the long holes 46 and 47 are formed in arcs centering around the centers of the rotation center members 56 and 57, respectively. In addition, the first coiled springs 50 and 51 are suspended between the stopper rods 60 and 61, and lock pins 81 and 82 protruding from the base units 14 and 15 of the seat cushions 19 and 21. Thereby, the first coiled springs 50 and 51 bias the stopper rods 60 and 61 in order to constantly pull the stopper rods 60 and 61.

The first and second tip-up lock plates 52 and 53, which, in this embodiment, are the "holding means", are pivotally supported by the base units 14 and 15 of the seat cushions 19 and 21 in a way that second pivotally supporting parts 62 and 63 make the first and second tip-up lock plates 52 and 53 capable of pivoting, respectively.

According to the embodiment illustrated, the first tip-up lock plates 52 and 53 include claw portions 52a and 53a. The claw portions 52a and 53a are biased by second coiled springs 64 and 65 in a way that the claw portions 52a and 53a face lower portions 46b and 47b (reference numeral 47b is not shown because it exists behind the stopper rod 61) of the long holes 46 and 47, in order to hold the cushion frames 23 and 29 of the seat cushions 19 and 21, which are tipped-up to predetermined positions shown in FIG. 7 by the first coiled springs 50 and 51, at the predetermined positions. Before tipped-up, the cushion frames 23 and 29 of the seat cushions 19 and 29 are in a state of being capable of being tipped up by the tip-up releasing means 48 and 49. In addition, the claw portions 52a and 53a engage with the stopper rods 60 and 61 in order to prevent the stopper rods 60 and 61 from moving to the upper end portions 46a and 47a of the long holes 46 and 47 again.

The second coiled springs 64 and 65 are suspended between end portions 52c and 53c and second lock pins 83 and 84. The end portions 52c and 53c are the opposite side of the first and second tip-up lock plates 52 and 53 from the claw portions 52a and 53a, having the second supporting parts 62 and 63 in the middle between the end portions 52c and 53c, and the claw portions 52a and 53a. The second lock pins 83 and 84 protrude from the base units 14 and 15 of the seat cushions 19 and 21. Thereby, the second coiled springs 64 and 65 bias the first tip-up lock plates 52 and 53 in order to constantly pull the first and second tip-up lock plates 52 and 53.

Figure 11:
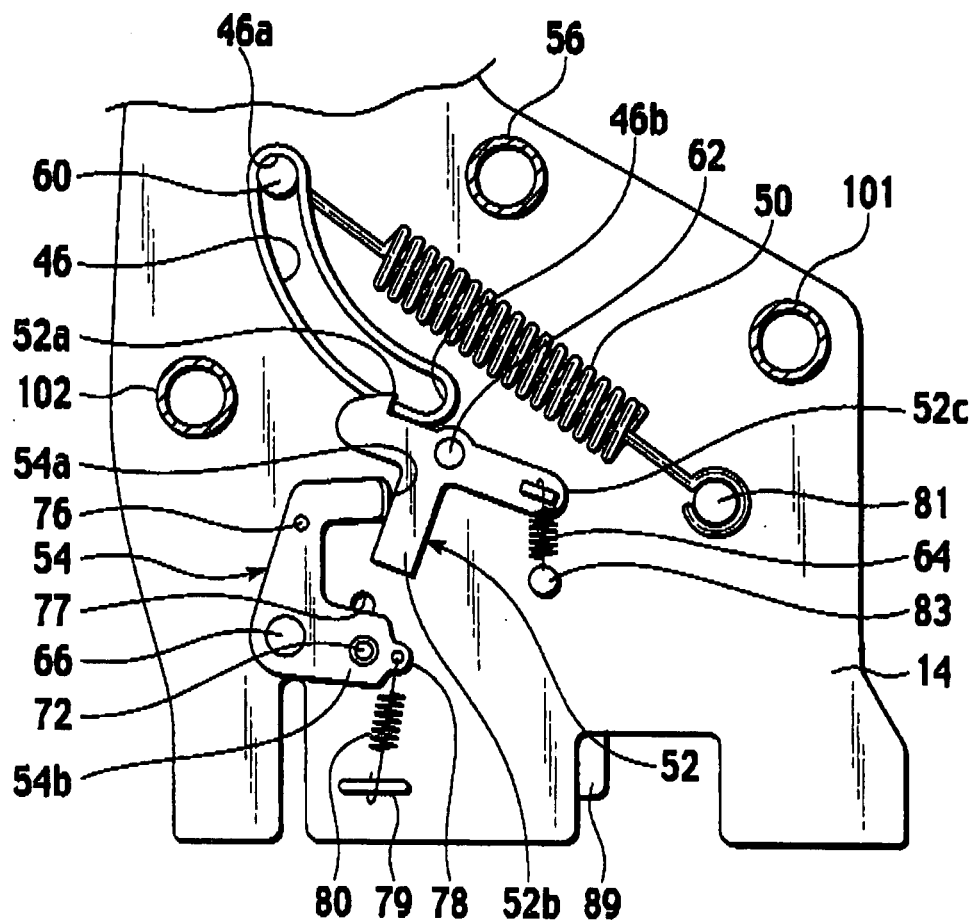
FIG. 11 is an enlarged side view showing the mechanical section in a vicinity of a base unit as viewed from a side XI indicated by an arrow in FIG. 10.
Figure 12:
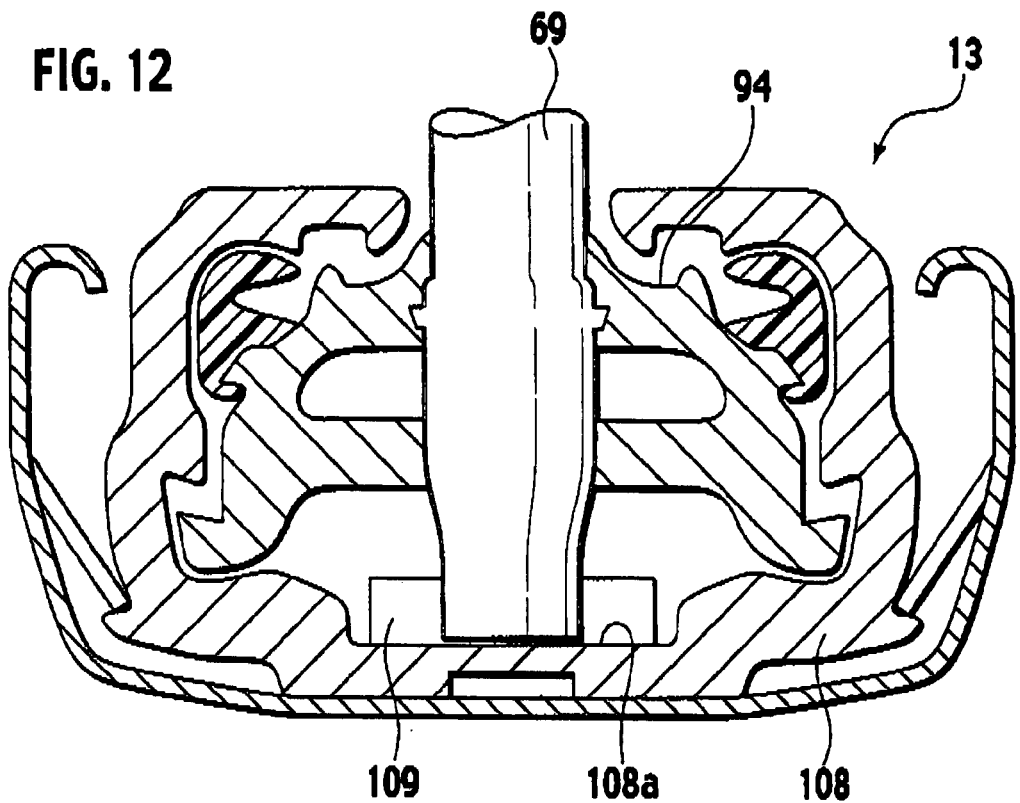
FIG. 12 is a cross-sectional view showing a relationship between a slide unit and an interlock pin in a portion concerned with the cross-sectional view of in FIG. 10.

Referring to FIGS. 9 and 11, the first interlock pin plate 54 is shown as being pivotally supported by the base unit 14 of the seat cushion 19 in a way that a third pivotally supporting part 66 makes the first interlock pin plate 54 capable of pivoting. The first interlock pin plate 54 is shaped almost like a letter L. The first interlock pin plate 54 includes an upper end portion 54a and a lower end portion 54b. The upper end portion 54a is formed in a protruded arc. In addition, the upper end portion 54a is arranged in a way that the upper end portion 54a faces a pressing member 52b extending from the first tip-up lock plate 52.

A fourth pivotally supporting part 72 is supported by the lower end portion 54b, and is capable of sliding in a long hole 77 which is formed in the base unit 14 of the seat cushion 19, and which is vertically long. With the fourth pivotally supporting part 72, the lower end portion 54b engages with an upper end portion 69a of an interlock pin 69 which is capable of being engaged with, and detached from, the interlocking means 35 arranged in any one of the slide units 12 and 13.

A lock part 76 protrudes from a portion between the upper end portion 54a and the lower end portion 54b. A wire connected to the operating means, which is not illustrated, is locked by the lock part 76. A protruding part 78 is further formed in the lower end portion 54b. A third coiled spring 80 is suspended between the protruding part 78 and a cut-and-raised piece 79 formed by cutting and raising a portion of the base unit 14 of the seat cushion 19. Thereby, the lower end portion 54b is constantly biased clockwise.

The second interlock pin plate 55 is configured of a first plate 70 and a second plate 71, as shown in FIG. 7.

According to an exemplary embodiment, the first plate 70 is formed as follows. The first plate 70 is pivotally supported by the base unit 5 of the seat cushion 21 in a way that a fifth pivotally supporting part 67 makes the first plate 70 capable of pivoting, and is shaped almost like a letter L. A first end portion 70a of the first plate 70 faces the second tip-up lock plate 53. The first plate 70 is capable of lifting up the second tip-up lock plate 53 forward FR of the second pivotally supporting part 63.

A second end portion 70b of the first plate 70 is pivotally supported by a first end portion 71a of the second plate 71 in a way that a sixth pivotally supporting part 73 makes the second end portion 70b capable of being pivotally supported.

A long hole 74 is formed in a part in the second end portion 70b, by which the sixth pivotally supporting part 73 is supported.

The second plate 71 is pivotally supported by the base unit 15 of the seat cushion 21 in a way that a seventh pivotally supporting part 75 makes the second plate 71 capable of pivoting, and is shaped almost like a letter L. The fourth pivotally supporting part 72 makes a second end portion 71b of the second plate 71 engage with the upper end portion 69a of the interlock pin 69, which is capable of being engaged with, and detached from, the interlocking means 35 arranged in any one of the slide units 12 and 13. In addition, the second end portion 71b is constantly biased in the counterclockwise direction in FIG. 7 by a sixth coiled spring 107 whose lower portion is suspended from the base unit 15.

The push plate 36 which, in this embodiment, is "pushing means" is arranged in a forward portion FR in the base 15 of the second rear seat 4. As shown in FIG. 7, a forefront side portion 36a of the push plate 36 in the second rear seat 4 protrudes forward FR from the base unit 15 so that the forefront side portion 36a should protrudes forward FR from the seat cushion 21 of the second rear seat 4, which is in the state of being tipped up.

Moving means 85 of the main body of the passenger's seat 2 includes a release bracket 86, a lock releasing plate 89 and interlock releasing means 90. The release bracket 86 is capable of moving forward FR when pushed by the push plate 36. The lock releasing plate 89, in this embodiment, is "slide lock releasing means" releasing a stopper lock pin 87, which, in this embodiment, is "stopper means," from the backward/forward slide locking means 34 in any one of the slide units 12 and 13 while pressed forward FR by a pressing part 86a of the release bracket 86. The interlock releasing means 90 releases the interlock pin 69 of the interlocking means 35 from locking means in any one of the slide units 12 and 13.

The release bracket 86 extends longitudinally in the forward-backward direction. A penetration hole 91 is formed on the release bracket 86, and has a long hole extending in the forward-backward direction. An eighth pivotally supporting part 88, protruding from the lower end portion 40b of the tip-up bracket 40, is inserted in, and supported by, the penetration hole 91. A rear end portion 86b of the release bracket 86 is formed in a flange which is at a right angle to the forefront side portion 36a so that the release bracket 86 can receive an input from the forefront side portion 36a of the push plate 36.

The interlock releasing means 90 is shaped like a letter L, and is pivotally supported by the base unit 14 in a way that a ninth pivotally supporting part 92 makes the interlock releasing means 90 capable of pivoting. An upper end portion 90a of the interlock releasing means 90 is pivotally supported by the release bracket 86 in a way that a tenth pivotally supporting part 93 makes the upper end portion 90a capable of pivoting. A lower end portion 90b of the interlock releasing means 90 is connected to the interlock pin 69 with the fourth pivotally supporting part 74. The third frame 103 has a function of restricting the rotation of the interlock releasing means 90.

Further detailed descriptions will be provided for the forward/backward slide locking means 34. According to an exemplary embodiment, the forward/backward slide locking means 34 includes a lock plate 95 pivotally supported by a movable rail 94 in any one of the slide units 12 and 13 in a way that the lock plate is capable of pivoting in the horizontal direction, a stopper lock pin 87 being "stopper means" in this embodiment, which is drooped from the lock plate 95, and a fourth coiled spring 96 biasing the lock plate 95 in a direction in which the lock plate 95 is locked.

Further detailed descriptions will be provided for the lock releasing plate 89. According to an exemplary embodiment, a pressure receiving part 97 is formed in a flange in a portion of the lock releasing plate 89 which contacts the pressing part 86a of the release bracket 86. An upper end portion 89a of the lock releasing plate 89 is pivotally supported by the base unit 14 in a way that an eleventh pivotally supporting part 98 makes the upper portion 89a capable of pivoting. A lower end portion 89b of the lock releasing plate 89 is arranged in a position where the lower end portion 89b contacts the lock plate 95. A long hole 100 is formed between the upper end portion 89a and the lower end portion 89b of the lock releasing plate 89. The long hole 100 extends in the forward-backward direction and is formed in an arc centering around the eleventh pivotally supporting part 98 so that the long hole 100 is capable of sliding backward and forward relative to a third lock pin 99 protruding from the base unit 14.

Figure 13:
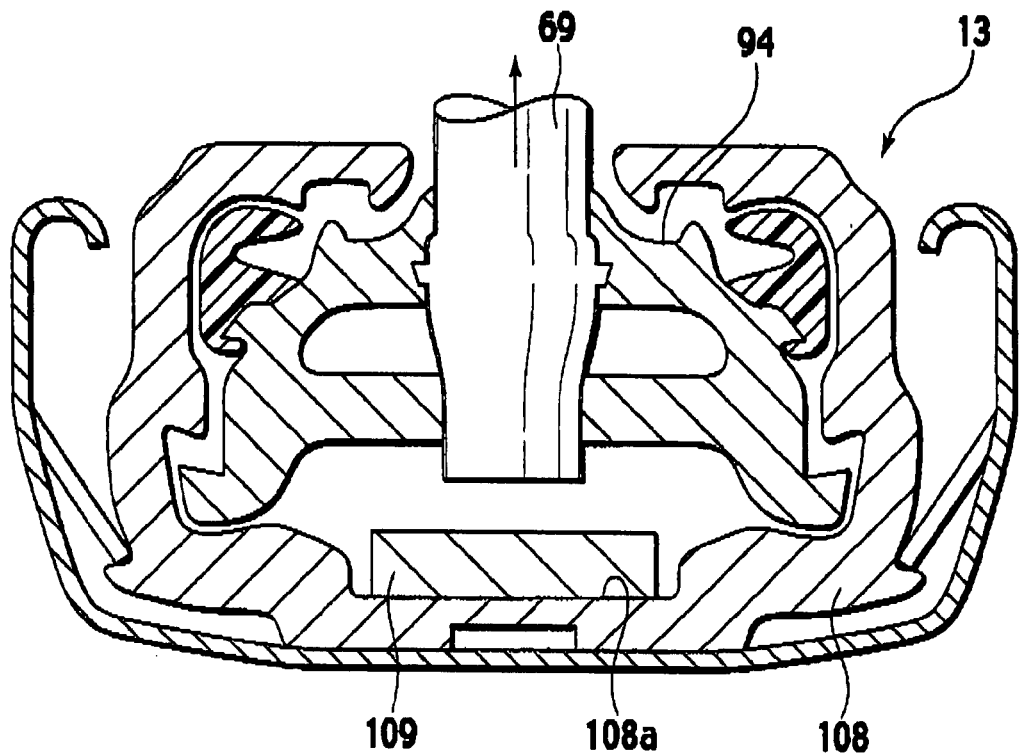
FIG. 13 is a cross-sectional view showing how a rail plate prevents engagement of the interlock pin shown in FIG. 12.

Descriptions will be provided next for the interlock mechanism in any one of the slide units 12 and 13 (in this case, the slide unit is denoted by reference numeral 13). According to an exemplary embodiment, the slide unit 13 includes a fixed rail 108, which is buried in the floor 5, and a movable rail 94, which is capable of moving backward and forward relative to the fixed rail 108. Rail plates 109 are arranged respectively in only portions in the bottom surface 108a of the fixed rail 108, which portions correspond to a first mode area A and a third mode area C shown in FIG. 8. In each of the portions provided with the respective rail plates 109, a lock hole 110 formed in the bottom surface 108a of the fixed rail 108 is closed. Thus, the interlock pin 69 is designed to be incapable of engaging with the lock hole 110 as shown in FIG. 13.

Figure 8:
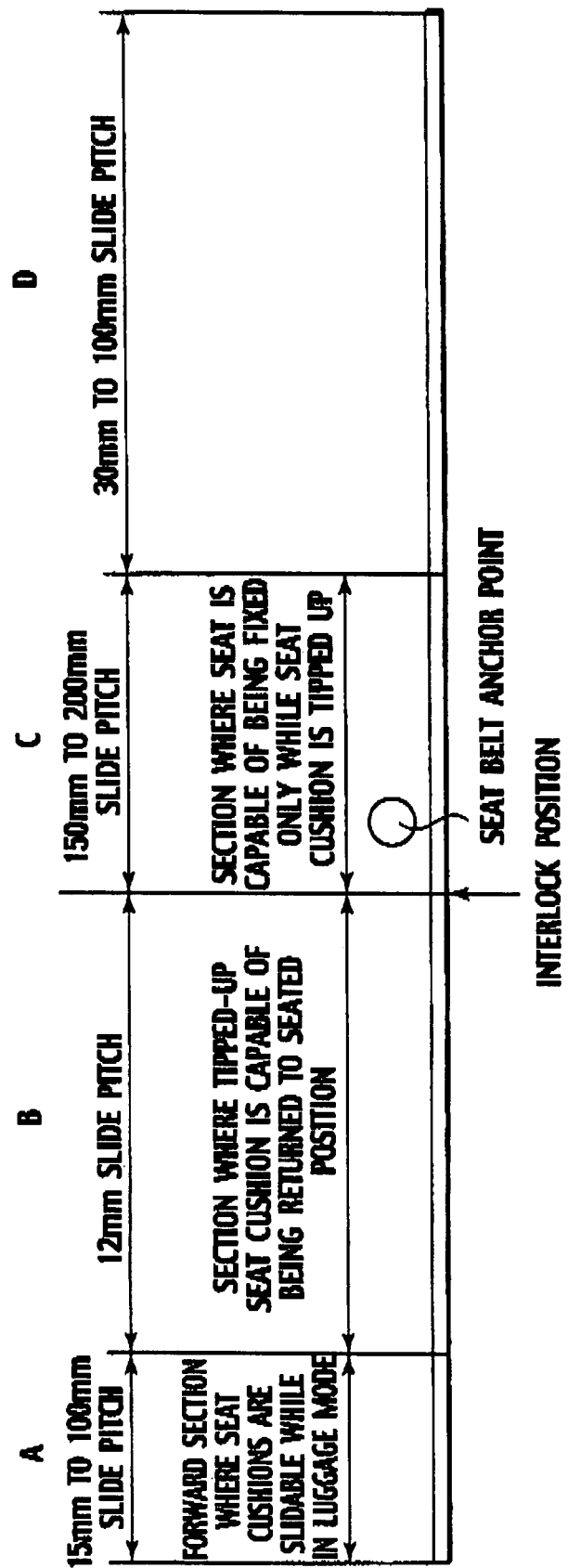
FIG. 8 is an explanatory diagram showing a movement plan for the seat structure for a vehicle shown in FIGS. 1-7.

According to an exemplary embodiment, the first mode area A in the bottom surface 108a of the fixed rail 108 is a forward area FR, where the seat cushions 19 and 21 are capable of sliding by every 15 mm to 100 mm pitch while in the state of being tipped up. Similarly, a second mode area B is located in the rear RR of the first mode area A, and is an area where the seat cushion 19 is capable of sliding by every 12 mm pitch. In the second mode area B, the seat cushion 19 in the state of being tipped up is capable of returning to the seated state, and is also capable of being interlocked. Similarly, the third mode area C is located in the rear RR of the second mode area B. In the third mode area C is an area where the seat cushions 19 and 21 are capable of sliding by every 150 mm to 200 mm pitch, and where the forward/backward slide locking means 34 is capable of being locked only while the seat cushions 19 and 21 are tipped up. Thus, the third mode area C is an area where neither the seat cushions 19 nor 21 is capable of being interlocked as described above. A fourth mode area D is located in the rear RR of the third mode area C. In the fourth mode area D, the seat cushion 19 is capable of sliding by every 30 mm to 100 mm pitch. In the fourth mode area D, the seat cushion 19 in the state of being tipped up is capable of returning to the seated state, and of being interlocked. It should be noted that, as shown in FIG. 8, a seat belt anchor point is located in the third mode area C, and is capable of supporting a seat belt for holding the lumbar of a passenger who is seated in the passenger's seat 2.

The interlock pin 69 is capable of being operated only by the operating means which is operated against the third coiled spring 80 and the sixth coiled spring 107. For this reason, while the passenger's seat 2 and the second rear seat 4 are in a luggage compartment which is the fourth mode area D, and where a passenger can be seated, the interlock pin 69 is capable of engaging with the interlocking means 35. However, the back rests 20 and 22 are in their upright positions, forward FR respectively of their neutral positions, and the seat cushions 19 and 21 are tipped up. As a result, a passenger can not be seated in the passenger's seat 2 or the second rear seat 4.

When the passenger's seat 2 and the second rear seat 4 are in the third mode area C, their interlock pins 69 are on the respective rail plates 109, and thus are lifted up. At this time, in the passenger's seat 2, the interlock pin plate 54 pivots about the third pivotally supporting part 66 clockwise, and thus the upper end portion 54*a* of the first interlock pin plate 54 is detached from the pressing member 52*b* of the first tip-up lock plate 52. For this reason, the claw portion 52*a* of the first tip-up lock plate 52 engages with the stopper rod 60. This makes it possible to hold the seat cushion 19 in the tip-up state.

In addition, in the second rear seat 4, the second plate 71 pivots about the seventh pivotally supporting part 75 clockwise, and the first plate 70 pivots about the fifth pivotally supporting part 67 counterclockwise. Thus, the first end portion 70*a*, protruding from the first plate 70, is detached from a portion forward FR of the second pivotally supporting part 63 of the first tip-up lock plate 53. For this reason, the claw portion 53*a* of the first tip-up lock plate 53 engages with the stopper rod 61. This makes it possible to hold the seat cushion 21 in the tip-up state.

When the passenger's seat 2 and the second rear seat 4 are in the second mode area B, the interlock pin 69 engages with the lock hole 110 formed in the bottom surface 108*a* of the fixed rail 108. The first interlock pin plate 54 and the second plate 71 of the second interlock pin plate 55 pivot counterclockwise respectively about the third pivotally supporting part 66 and the seventh pivotally supporting part 75 in FIG. 7.

The upper end portion 54*a* of the first interlock pin plate 54, which is pivoted, presses the pressing member 52*b* extending from the first tip-up lock plate 52. Thus, the first tip-up lock plate 52 pivots clockwise about the second pivotally supporting part 62. Hence, the claw portion 52*a* is detached from a position where the claw portion 52*a* juts out into the long hole 46. This makes the stopper rod 60 capable of moving along the long hole 46, and thereby the seat cushion 19 is made capable of moving to the seated position.

Similarly, the upper end portion 71*a* of the second plate 71 of the second interlock pin plate 55 which is pivoted causes the first plate 70, which is connected to the upper end portion 71*a* with the sixth pivotally supporting part 73, to pivot clockwise about the fifth pivotally supporting part 67. Thus, the first end portion 70*a* protruding from the first plate 70 pushes up a portion of the first tip-up lock plate 53, which portion is located forward FR of the second pivotally supporting part 63. Hence, the first tip-up lock plate 53 pivots clockwise about the second pivotally supporting part 63, and the claw portion 53*a* of the first tip-up lock plate 53 is detached from a position where the claw portion 53*a* juts out into the long hole 47. This makes the stopper rod 61 capable of moving along the long hole 47, and thereby the seat cushion 21 is made capable of moving to the seated position.

Descriptions will now be provided for the operation of the exemplary embodiment detailed above.

Regarding the passenger' seat 2 and the second rear seat 4, the back rests 20 and 22 are capable of moving to their respective positions where the back rests 20 and 22 stand almost upright, and the seat cushions 19 and 21 are capable of being tipped up, by operating means which is not illustrated. This configuration makes the passenger's seat 2 capable of being moved forward FR by operating only the second rear seat 4 after the predetermined operation. Specifically, this configuration improves the operability, with which the passenger's seat 2 and the second rear seat 4 are collected together in a place, to a large extent.

In addition, the forward/backward slide locking means 34 and the interlocking means 35 of the passenger's seat 2 are capable of being released by the push plate 36 of the second rear seat 4. For this reason, the push plate 36 releases the forward/backward slide locking means 34 and the interlocking means 35 only by pushing the back of the passenger's seat 2 with the second rear seat 4. Thus, the passenger's seat 2 is capable of moving forward to FR with a force with which the second rear seat 4 is pushed forward FR.

Furthermore, the tip-up mechanisms 37 and 38 of the seat cushions 19 and 21 include the tip-up releasing means 48 and 49 for releasing the tip-up brackets 40 and 41 of the seat cushions 19 and 21, the first coiled springs 50 and 51 for tipping up the seat cushions 19 and 21, which are made capable of being tipped up by the tip-up releasing means 48 and 49, to the predetermined positions, and the first and second tip-up lock plates 52 and 53 for holding the seat cushions 19 and 21, which have been moved to the tip-up positions, at the same tip-up positions. When the back rests 20 and 22 are moved to their respective positions where the back seats 20 and 22 stand almost upright, the foregoing configuration makes it possible to release the first tip-up lock plates 52 and 53 respectively of the seat cushions 19 and 21 held in their seated positions, to thus cause the first coiled springs 50 and 51 to tip-up and move the seat cushions 19 and 21, respectively, and to hence cause the first and second tip-up lock plates 52 and 53 to hold the seat cushions 19 and 21, which have been tipped up, at their respective tipped-up positions. In addition, the tip-up mechanism 37 and 38 include the first and second interlock pin plates 54 and 55 which are capable of releasing the first and second tip-up lock plates 52 and 53, respectively. This makes it possible to return the seat cushions 19 and 21 to their original positions.

Moreover, the stopper lock pin 87 of the forward/backward slide locking means 34 and the interlocking means 35 are designed to be capable of being released when the release bracket 86 of the passenger's seat 2 is pushed by the push plate 36 of the second rear seat 4. Thus, the passenger's seat 2 is also capable of moving when pushed by the second rear seat 4.

Additionally, the forefront side portion 36*a* of the push plate 36 of the second rear seat 4 is located in the position jutting out forward FR of the seat cushion 21 of the second rear seat 4 in the state of being tipped up. For this reason, whenever the second rear seat 4 is moved forward FR, the second rear seat 4 is always capable of pressing the moving means 85 of the passenger's seat 2. This makes it possible to securely move the passenger's seat 2, together with the second rear seat 4, forward FR.

The foregoing example has been described with reference to a configuration where the passenger's seat 2 is the front seat body, and the second rear seat 4 is the rear seat body. However, the example is not limited to this case. The driver's seat 1 may be the front seat body, and the first rear seat 3 may be the rear seat body.

Further, it is important to note that the present invention is not limited to what has been described for the foregoing embodiment of the present invention. The present invention can be carried out in various modes through modifications depending on the necessity.

It should be noted that all of the contents of Japanese Patent Application No. 2004-346033 (filed on Nov. 30, 2004) are incorporated in the description of the present invention through the references

The invention claimed is:

1. A seat structure for a vehicle, comprising:
a front seat body including a seat cushion with a front part configured to be tipped up about a rear part of the seat cushion from a seated position and a back rest with an upper part configured to be tilted backward and forward about a lower part of the back rest;
a rear seat body including a seat cushion with a front part configured to be tipped up about a rear part of the seat cushion from a seated position and a back rest with an upper part configured to be tilted backward and forward about a lower part of the back rest;
first slide rails supporting the front seat body and the rear seat body in a fore and aft manner respectively, each of the front and rear seat bodies being configured to move backward and forward along the first slide rails to an appropriate position and stopping there; and
operating means for moving the back rest of each of the front and rear seat bodies to a position where the back rest stands substantially upright, for concurrently tipping up the seat cushion of each of the front and rear seat bodies, and for positioning the front seat body to be moved forward by the rear seat body.

2. The seat structure of claim 1 wherein
the front seat body includes forward/backward slide locking means and interlocking means; and
the rear seat body includes pressing means,
wherein the forward/backward slide locking means and the interlocking means are configured to be released by the pressing means.

3. The seat structure of claim 2 wherein
each of the front and rear seat bodies includes a tip-up mechanism for tipping up the seat cushion; and
the tip-up mechanism of the seat cushion comprises:
  seated position holding means;
  tip-up releasing means for releasing the seated position holding means of the seat cushion by moving the back rest to the position where the back rest stands substantially upright;
  biasing means for tipping up the seat cushion made ready to be tipped up by the tip-up releasing means to a predetermined position;
  holding means for holding the seat cushion that has been moved to the tipped-up position at the same tipped-up position; and
  return release means for releasing the holding means.

4. The seat structure of claim 3 wherein
the pressing means of the rear seat body includes a push plate arranged in a forward portion of the rear seat body;
the front seat body includes moving means;
the forward/backward slide locking means includes stopper means; and
the moving means of the front seat body comprises:
  a release bracket configured to move forward when pushed by the push plate;
  slide lock releasing means for releasing the stopper means of the forward/backward slide locking means when pushed forward by the release bracket; and
  interlock releasing means for releasing the interlocking means when pushed forward by the release bracket.

5. The seat structure of claim 4 wherein
a forefront side portion of the push plate of the rear seat body is located in a position jutting out forward of the seat cushion of the rear seat body in a state of being tipped up.

6. The seat structure of claim 2 wherein
the pressing means of the rear seat body includes a push plate arranged in a forward portion of the rear seat body;
the front seat body includes moving means;
the forward/backward slide locking means includes stopper means; and
the moving means of the front seat body comprises:
  a release bracket configured to move forward when pushed by the push plate;
  a slide lock releasing means for releasing the stopper means of the forward/backward slide locking means when pushed forward by the release bracket; and
  interlock releasing means for releasing the interlocking means when pushed forward by the release bracket.

7. The seat structure of claim 6 wherein
a forefront side portion of the push plate of the rear seat body is located in a position jutting out forward of the seat cushion of the rear seat body in a state of being tipped up.

8. A seat structure for a vehicle, comprising:
front and rear seat bodies each including a seat cushion, a back rest and a tip-up mechanism for tipping up the respective seat cushion, each seat cushion having a front part configured to be tipped up about a rear part of the seat cushion, and each back rest having an upper part configured to be tilted backward and forward about a lower part of the back rest, the tip-up mechanism comprising:
  a first spring biasing the seat cushion toward a tipped up position;
  a tip-up bracket pivotally coupled to a base unit of the seat cushion and configured to restrict the seat cushion from moving toward the tipped up position;
  a lock plate for holding the seat cushion in the tipped up position; and
  a stopper rod slidable within an aperture in the base unit and pivotally coupled to a bracket pivotally coupled at the rear part of the seat cushion;
first slide rails supporting the front and rear seat bodies in a fore and aft arrangement respectively, the front and rear seat bodies being configured to move backward and forward along the first slide rails;
a lock member coupled to the front seat body for selectively securing the front seat body relative to the first slide rails, the lock member being movable between a locked position and a released position; and
a push member coupled to the rear seat body,
wherein the push member engages the front seat body to move the lock member into the released position so that the front seat body can be moved forward by the rear seat body,
wherein the tip-up bracket includes a first protrusion configured to at least partially block the aperture in the base unit to restrict the seat cushion from moving toward the tipped up position.

9. The seat structure of claim 8 wherein the rear seat body further includes a base unit, the push member being coupled to a front portion of the base unit.

10. The seat structure of claim 9 wherein the push member is a plate.

11. The seat structure of claim 8 wherein the lock member is a lock releasing plate that is biased toward the locked position by a spring.

12. A seat structure for a vehicle, comprising:
front and rear seat bodies each including a seat cushion, a back rest and a tip-up mechanism for tipping up the respective seat cushion, each seat cushion having a front part configured to be tipped up about a rear part of the seat cushion, and each back rest having an upper part configured to be tilted backward and forward about a lower part of the back rest, the tip-up mechanism comprising:
  a first spring biasing the seat cushion toward a tipped up position;
  a tip-up bracket pivotally coupled to a base unit of the seat cushion and configured to restrict the seat cushion from moving toward the tipped up position;
  a lock plate for holding the seat cushion in the tipped up position; and
  a stopper rod slidable within an aperture in the base unit and pivotally coupled to a bracket pivotally coupled at the rear part of the seat cushion;
first slide rails supporting the front and rear seat bodies in a fore and aft arrangement respectively, the front and rear seat bodies being configured to move backward and forward along the first slide rails;
a lock member coupled to the front seat body for selectively securing the front seat body relative to the first slide rails, the lock member being movable between a locked position and a released position; and
a push member coupled to the rear seat body,
wherein the push member engages the front seat body to move the lock member into the released position so that the front seat body can be moved forward by the rear seat body,
wherein the aperture is in the shape of an arc having a center that is the same as a bracket that is pivotally coupled at the rear part of the seat cushion.

13. A seat structure for a vehicle, comprising:
front and rear seat bodies each including a seat cushion, a back rest and a tip-up mechanism for tipping up the respective seat cushion, each seat cushion having a front part configured to be tipped up about a rear part of the seat cushion, and each back rest having an upper part configured to be tilted backward and forward about a lower part of the back rest, the tip-up mechanism comprising:
  a first spring biasing the seat cushion toward a tipped up position;
  a tip-up bracket pivotally coupled to a base unit of the seat cushion and configured to restrict the seat cushion from moving toward the tipped up position;
  a lock plate for holding the seat cushion in the tipped up position; and
  a stopper rod slidable within an aperture in the base unit and pivotally coupled to a bracket pivotally coupled at the rear part of the seat cushion;
first slide rails supporting the front and rear seat bodies in a fore and aft arrangement respectively, the front and rear seat bodies being configured to move backward and forward along the first slide rails;
a lock member coupled to the front seat body for selectively securing the front seat body relative to the first slide rails, the lock member being movable between a locked position and a released position; and
a push member coupled to the rear seat body,
wherein the push member engages the front seat body to move the lock member into the released position so that the front seat body can be moved forward by the rear seat body,
wherein a first end of the first spring is coupled to the stopper rod.

14. A method of selectively moving a first seat body and a second seat body within a vehicle, the method comprising:
providing front and rear seat bodies each including a seat cushion and a back rest, each seat cushion having a front part configured to be tipped up about a rear part of the seat cushion, and each back rest having an upper part configured to be tilted backward and forward about a lower part of the back rests;
providing first slide rails supporting the front and rear seat bodies in a fore and aft arrangement respectively, the front and rear seat bodies being configured to move backward and forward along the first slide rails;
providing a lock member coupled to the front seat body for selectively securing the front seat body relative to the first slide rails, the lock member being movable between a locked position and a released position;
providing a push member coupled to the rear seat body;
allowing the lock member to move to the released position when the push member engages the front seat body so that the front seat body can be moved forward by the rear seat body; and
providing a tip-mechanism for tipping up the seat cushions, the tip-up mechanism comprises:
  a first spring biasing the seat cushion toward a tipped up position;
  a tip-up bracket pivotally coupled to a base unit of the seat cushion and configured to restrict the seat cushion from moving toward the tipped up position;
  a lock plate for holding the seat cushion in the tipped up position; and
  a stopper rod slidable within an aperture in the base unit and pivotally coupled to a bracket pivotally coupled at the rear part of the seat cushion,
wherein the tip-up bracket includes a first protrusion configured to at least partially block the aperture in the base unit to restrict the seat cushion from moving toward the tipped up position.

* * * * *